United States Patent [19]

Bicknell

[11] Patent Number: 4,481,576
[45] Date of Patent: Nov. 6, 1984

[54] METHOD OF STORING DATA IN A MEMORY OF A DATA PROCESSING SYSTEM

[75] Inventor: John Bicknell, Rudgwick, England
[73] Assignee: U.S. Philips Corporation, New York, N.Y.
[21] Appl. No.: 359,643
[22] Filed: Mar. 19, 1982

[30] Foreign Application Priority Data

Mar. 25, 1981 [GB] United Kingdom ............... 8109381

[51] Int. Cl.³ ........................................... G06F 13/00
[52] U.S. Cl. ................................................. 364/200
[58] Field of Search .......................... 364/200 MS File

[56] References Cited

U.S. PATENT DOCUMENTS 4,383,296 5/1983 Sander ............................. 364/200

*Primary Examiner*—Raulfe B. Zache
*Attorney, Agent, or Firm*—Thomas A. Briody; Jack E. Haken; James J. Cannon, Jr.

[57] ABSTRACT

When addressing a store comprising a plurality of low speed memory blocks each of which can be accessed through a high speed buffer having a limited number of memory elements, in accordance with a pattern which is more flexible than sequential then conflicts can occur due to overloading of the memory elements. In order to avoid this, prior to storing data, the address parameters are calculated taking into account the read/write sequence, depth of buffer and access times and a check is made to see if there are any conflicts among the simulated addresses. If so then a number of alternative measures can be tried in order to resolve the conflicts. Such measures include the use of a small capacity, high speed vestigial memory, adding an offset to the addresses or skipping a number of addresses. Once acceptable address parameters have been calculated then a hardware address generator can be instructed to address data accordingly.

8 Claims, 3 Drawing Figures

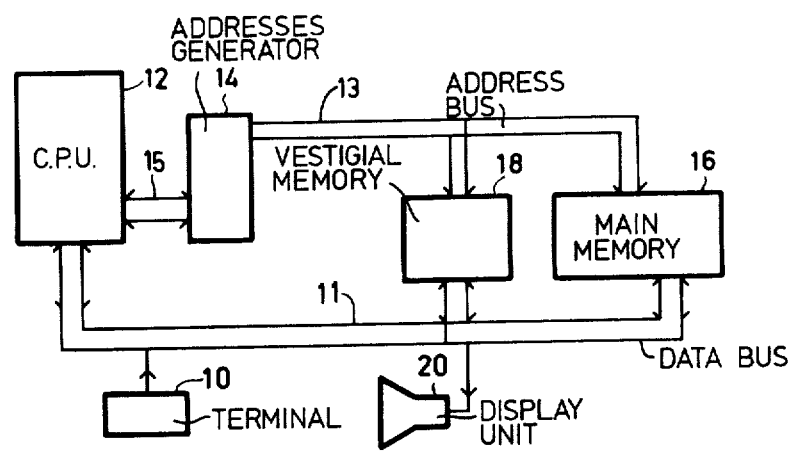
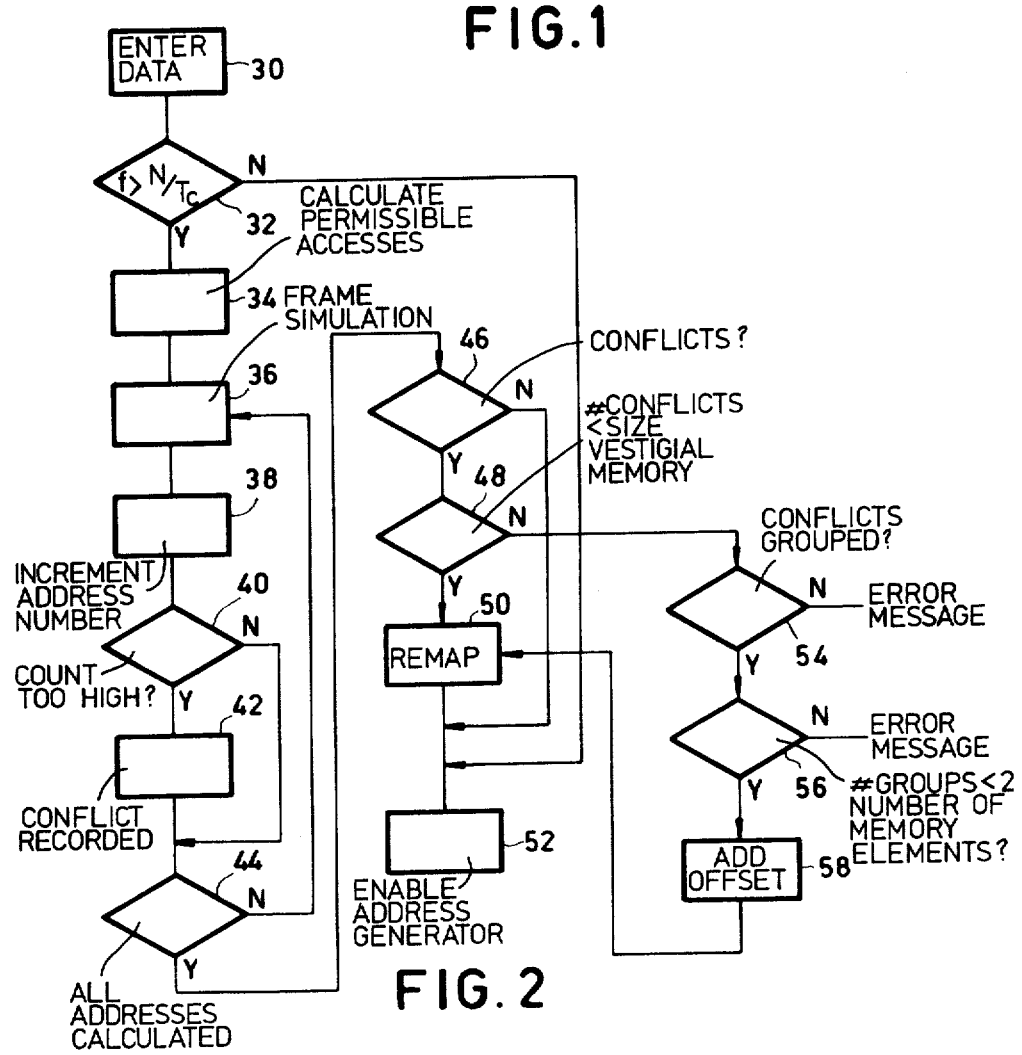
FIG.1
FIG.2

METHOD OF STORING DATA IN A MEMORY OF A DATA PROCESSING SYSTEM

BACKGROUND OF THE INVENTION

1. Field of the Invention

The present invention relates to a method of storing data in a memory of a data processing system, which memory comprises a plurality of memory blocks. The method has particular, but not exclusive, application to image processing. The present invention also relates to a data processing system for the application of said method.

2. Description of the Prior Art

In image processing systems a scene is scanned and information, for example image contrast information, concerning an aspect of the scene is stored for further processing. The processing may (or may not) be carried out in real time. The scanning may be done in a sequential manner or a pseudo-random manner. Also the speed of scanning of a scene depends on whether or not there is movement and, if there is, the speed of movement of the object(s) of interest.

When scanning a scene, elements of a scene of an arbitrary predetermined size, generally termed pixels, are normally stored in a semiconductor frame store. One characteristic of the frame store is that the system must be able to write-in and read-out information relating to a pixel at a certain speed, the whole read/write cycle taking place at frame rates.

An important parameter concerning semiconductor memories is access time, that is, the time period to address a location in a store and read-out or write-in the information to be stored. In the case of scanning a scene at video speeds, the access time would be of the order of tens or a few hundreds of nanoseconds which means either an expensive high speed frame store has to be provided or steps are taken to achieve the desired access time using cheaper low speed stores. One method of using low speed devices is to have a low speed main memory comprising a plurality of small high speed parallel arranged blocks or stages each of which has a buffer. The blocks are multiplexed so that each one is addressed in sequence at frame speeds and the information to be stored at the addressed location is held temporarily in the high speed buffer and is read-out to the addressed block location during the remainder of the period of that multiplex cycle. Thus by way of example if a frame store comprises 16 blocks with associated high speed buffers and each block has a maximum capacity of $32 \times 512$ pixels, then in order to scan an entire frame in 20 mS, each location has to be addressed in $(20 \times 10^{-3})/(512 \times 512)$ sec or 76 nS. This means that the high speed buffer has to accessible in 76 nS, however, since there are 16 blocks then the high speed buffer can dump the information into its associated block in $16 \times 76$ nS $= 1.216$ $\mu$S before having to be ready to receive the information relating to the next pixel to be stored in that block.

This multiplexing approach is satisfactory if the frame is scanned at a frequency and in a sequence which permits each storage location to read-out and write-in information within its maximum time. However, conflicts will occur when the scanning pattern is such that it may be necessary to address any one of the 16 low speed blocks two or more times in one cycle or when it is desired to operate the block above its maximum access speed. One way of resolving this problem is to provide additional buffers. However this is not a satisfactory solution since the buffers may become depleted by successive reads and overfilled by successive writes.

It is an object of this invention to overcome this problem.

SUMMARY OF THE INVENTION

According to the present invention there is provided a method of storing data in a memory, which method comprises the steps of:

(a) checking if storing according to a standard address pattern is applicable for a required storage operation without infringing an access restriction of the addressed memory block, and in the case where said standard address pattern is applicable, activating an address generator for generating addresses according to said standard address pattern;

(b) in the case where said standard address pattern is not applicable, remapping, according to a first predetermined distribution pattern, the addresses of those locations in the memory to which access is required;

(c) checking if storing according to said first predetermined distribution pattern is applicable for the required storage operation without infringing an access restriction of the addressed memory block, and in the case where said first predetermined distribution pattern is applicable, activating said address generator for generating addresses according to said first predetermined distribution pattern; and (d) in the case where said first predetermined distribution pattern is not applicable, generating a first conflict signal.

In carrying out the present invention, the addressing of the memory, for example a frame store, is placed under computer control in order to increase the speed at which scanning patterns may be implemented and reducing the access restrictions imposed by the multiplexing technique. The computer is able to predict possible conflicts resulting from a predetermined proposed scanning pattern at a particular frequency and steps are taken to resolve them by manipulating addressing within the frame store. In other words, the computer knowing the scanning sequence, for example a local area pattern repeated across the field or a series pattern such as a pseudorandom pattern, and the access time for a memory location in the low speed store is able to predict when and where conflicts are likely to occur and take appropriate action to resolve them.

The method in accordance with the invention may preferably be characterized in that, after generating said first conflict signal, the method comprises the steps of:

(a) remapping, according to a second predetermined address pattern, the addresses of those locations in the memory to which access is required;

(b) checking if storing according to said second predetermined address pattern is applicable for required storage operation without infringing an access restriction of the addressed memory block, and in the case where said second predetermined address pattern is applicable, activating said address generator for generating addresses according to said second predetermined address pattern; and (c) in the case where said second predetermined address pattern is not applicable, generating a second conflict signal.

When a first remapping fails, then a second, more sophisticated remapping is tried.

In case of low activity infringements these can be solved conveniently by a method in accordance with the invention wherein remapping according to a first predetermined distribution pattern comprises decreasing the frequency of access to the memory.

For example the read or write clock frequency is reduced to one which will permit the reading-out and writing-in without infringing the access restrictions.

In the situation where infringements appear to be grouped the infringements may be solved by remapping according to a second predetermined address pattern which comprises the redistribution over an offset added to the store addresses. In this case the address is modified so that the associated informaton is stored in another location of the memory block.

When the number of infringements is small, the infringements may be resolved by remapping according to a second predetermined address pattern which comprises the remapping of the address infringing the access restriction to a location of a vestigial memory and the storage in said vestigial memory of said address and the associated data. The remapping to a vestigial memory, which is a high speed memory, coupled to the slower main memory eliminates the origin of the infringements.

The method in accordance with the invention may be applied in a data processing system comprising a display device with line-wise scanning. For this application said remapping comprises the remapping of the address infringing the access restriction to a buffer, said buffer being filled during a line scan and emptied during the flyback period of said scanning.

The present invention also provides a frame store comprising a main memory, a vestigial memory, a hardware address generator for generating storage addresses for data to be stored in the main or vestigial memories, and means for calculating the addresses of storage locations for data, checking to see if there are any infringements of the access restrictions to the main memory and resolving any such infringements by changing the addressing, said means having an output for instructing the address generator to generate addresses in accordance with those calculated to avoid conflicts.

BRIEF DESCRIPTION OF THE DRAWINGS

The present invention will now be described, with reference to the accompanying drawings, wherein:

FIG. 1 is a block schematic circuit diagram of a simplified example of a data processing unit for applying the method of the invention;

FIG. 2 is a preferential form for a flow chart relating to the calculation of address parameters, prediction of conflicts and resolution of the same.

DESCRIPTION OF THE PREFERRED EMBODIMENT

Figure 3:
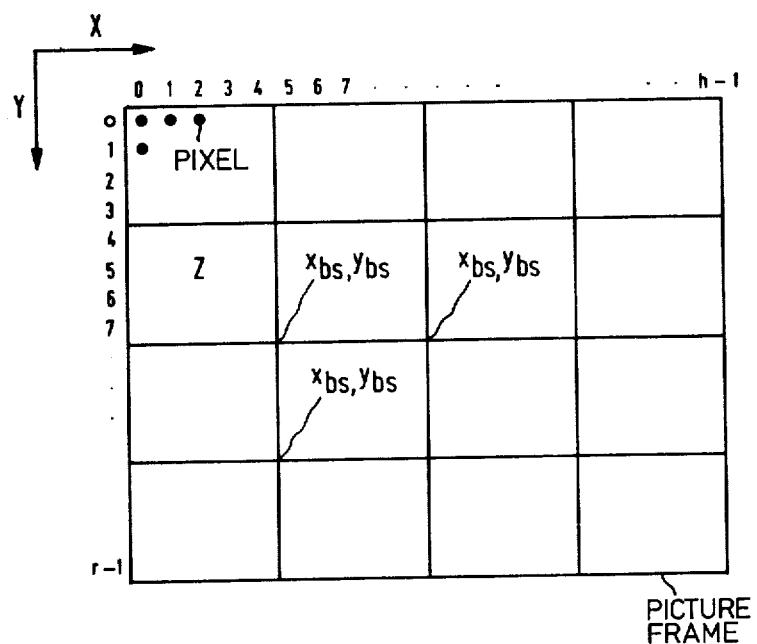
FIG. 3 is a frame of a display and serves to explain exemplary addressing of a frame store.

Referring now to FIG. 1 there is shown a simplified example of a data processing unit or a computer for applying the method of the invention. The data processing unit comprises a central processing unit 12 which is connected to a databus 11. On the databus there is also connected a main memory 16, a vestigial memory 18, a display unit 20 and a terminal 10. The terminal 10 is used to enter information such as the scanning pattern and the speed of scanning into the central processing unit 12. The main memory 16 comprises a plurality of memory blocks (not shown) which are, for example, Mostek MK 4116 dynamic RAM's. The vestigial memory 18 is a small fast memory. A hardware address generator 14 is connected via a bus 15 to the central processing unit 12. An output of the hardware address generator is connected to an address bus 13 which is further connected to an address input of the main memory 16 and the vestigal memory 18. The hardware address generator 14 is responsible not only for assigning an address to data to be stored in the main or vestigial memories 16, 18 but also fo the sequence in which data is stored so that it can be read-out in the desired sequence.

Details of the hardware address generator 14 and the main and vestigial memories 16 and 18 have been omitted in the interests of brevity because they are known components and their construction is unimportant for understanding the present invention.

The central processing unit 12 will store the characteristics of a main, low speed memory 16, such as the number and size of the blocks of the frame store and their access times. From this information the computer calculates the liklihood of possible conflicts or infringements of the access restriction of the addressed blocks by storing data in the main memory in accordance with a standard pattern, for example say by simple sequential multiplexing of the blocks of the memory 16. If conflicts are noted then the computer recalculates the storage addresses in the main memory 16 in accordance with another address pattern and checks to see if there are any conflicts. Assuming that there are no further conflicts the computer instructs the hardware address generator 14 to assign the addresses as calculated to the data to be stored. If it is necessary to use the vestigial memory 18 to resolve the conflicts then the hardware address generator 14 assigns the appropriate addresses which are sent via the address bus 13 to the vestigial memory 18.

The data processing unit may comprise part of an image processing system in which image contrast information is to be stored and read-out in accordance with a desired scanning sequence which may not be sequential, for example a local area pattern repeated across the field or a series pattern such as a pseudo-random pattern.

Referring to FIG. 3, in the case of scanning using a local area pattern is according to the following pattern. The X-Y coordinates, X,Y are the overall coordinates of the frame can be defined as $$X = kx_{bs} + p \qquad (1)$$

$$Y = ly_{bs} + q \qquad (2)$$

where p and q are the local area coordinates and $$0 \leq p \leq x_{bs} - 1$$

$$0 \leq q \leq y_{bs} - 1$$

and $x_{bs}$, $y_{bs}$ is the block size coordinate in a number of pixels in the X and Y directions respectively.

k is the horizontal repeat number, and l is the vertical repeat number. By a repeat number is meant the number of adjacent local areas in the horizontal (or vertical) direction from an origin (0,0) up to, but not including, the local area in which the pixel lies. For example in FIG. 3, $0 \leq k \leq 3$ and $0 \leq l \leq 3$ where k and l are integers.

FIG. 3 shows a picture frame having h pixels in the horizontal or X direction and there being r lines in vertical or Y direction. The frame is addressed linewise with serial loading of the memory. The memory address A for a pixel Z in FIG. 3, Z having the coordinates X, Y, for example (2, 5) is formed by $$A = 5 \cdot h + 2$$

so generally $A = Y \cdot h + X$ \hfill (3)

and by substituting expressions (1) and (2) in expression (3) one gets $$A = (ly_{bs} + q) h + k \, x_{bs} + p$$

In order to illustrate a set of conditions for non-conflict and conflict situations, assume that the main (slow speed) memory comprises N blocks or stages (where N=16) which are arranged in parallel, that the access time (read, write, refresh) of the main memory is $T_c$ (where $T_c = 400$ nS) and $T_D$ the access time of the buffer (where $T_D = 50$ nS). A number $B_n$ of parallel arranged (high speed) buffers are provided for example $B_n = 16$ and $B_D$ is the depth of each buffer. $D_n$ is (are) the data word(s) coming into buffer n ($n \leq B_n$) within the access time $T_c$ of the main memory. The buffers can be filled with incoming data words in a sequential or random access manner and assuming that data is applied cyclically to the buffers then all the conditions for access and data are satisfied when $T_c/T_D \leq B_n$.

For other address patterns, the conflict/non-conflict situation can be determined from the following general case if the above one does not hold true:

With a data rate of $D_n / T_c$ the number of accesses to the main store for one buffer is $$\frac{D_n}{T_c/T_D}$$

which must be an integer and if the quotient is not an integer then it is rounded down to the nearest integer.

The data remaining in one buffer is given by $$D_n - \frac{D_n}{T_c/T_D}$$

and for $B_n$ buffers the data remaining is given by $$B_n \left[ D_n - \frac{D_n T_D}{T_c} \right]$$

The point of conflict for one buffer is given by $$D_n - \frac{D_n T_D}{T_c} = B_D$$

And for $B_n$ buffers the point of conflict is given by $$B_n \left[ D_n - \frac{D_n T_D}{T_c} \right] = B_n B_D$$

where $B_n B_D$ is the total buffer capacity.

Thus no conflicts will occur if for each buffer $$D_n - \frac{D_n T_D}{T_c} < B_D$$

$$D_n \left[ 1 - \frac{T_D}{T_c} \right] < B_D$$

$$\left[ 1 - \frac{T_D}{T_c} \right] \leq \frac{B_D}{D_n}.$$

conflicts will occur if $$1 - \frac{T_D}{T_c} > \frac{B_D}{D_n}$$

accordingly for $B_n$ buffers conflicts will occur if $$B_n [1 - T_D/T_c] > \frac{B_n \cdot B_D}{D_n}$$

If conflicts occur they may be resolved in a number of ways including:

(1) Reducing the read or write clock frequency to one which will permit the reading-out and writing-in without conflicts. This solution is possible with a scene in which there is a low activity but not for one in which there is a high activity and is possible in a system protocol which permits such a reduction in frequency (e.g. directly addressed X-Y display).

(2) In the situation where conflicts occur near the point of conflict mentioned previously, the conflicts may be resolved by adding a suitable bias or offset to the store address, in other words the store address of a pixel is modified so that its data is stored in a different location of the block or overall frame store so that a conflict situation is avoided.

(3) Where the conflict is periodic in address, it may be resolved by simply skipping those memory locations in the frame store which produce the conflict with the particular addressing pattern used.

(4) When the number of conflicts is such that the information to be stored at the conflicting addresses can be stored in a vestigial memory, for example the memory 18 in FIG. 1, then the address pattern is adapted to map the data for the addresses in conflict into the vestigial memory. This vestigial memory is a small high speed memory which is coupled to the larger and slower main memory, for example the memory 16 in FIG. 1. When a conflict situation is recognized the address of the pixel is changed and the information is mapped to a location in the vestigial memory so that in processing the information in the frame store, addresses in the vestigial memory are automatically interrogated rather than in the main memory where conflicts have been recognized.

(5) In a display system using a line-wise scanning an additional buffer is provided in the main memory which additional buffer can be filled during the line scan and emptied during the fly-back period or during the dead time in the scan (applies to the write operation only).

The processing system is essentially an iterative one because once certain parameters are known, namely the number and size of the blocks of the frame store and their access times, the scanning pattern and the speed of scanning of the scene; the probability of conflicts is calculated as the addresses are considered in sequence.

When the number and nature of conflicts has been established, then the address pattern is adapted so that, for example, the addresses of the conflicts are mapped to the vestigial memory or a constant offset is applied to all addresses, and the scanning pattern is repeated. If no further conflicts are identified then the address pattern is left as set but if further conflicts are identified, then another attempt is made to adapt the address pattern to suit the situation. This continues until the conflicts have been eliminated or it is realized that they cannot be resolved.

The flow chart of FIG. 2 sets out a sequence of steps involved in carrying out an embodiment of the method in accordance with the present invention.

In FIG. 2 the customary symbols of a rectangle for representing an operation step and a diamond for representing a decision step have been used and for convenience of description both will be referred to as blocks. In the case of a decision block Y represents a true and N a false answer to the question posed.

Block 30 represents the entering of details such as the writing-in and reading-out sequence and the access frequency, f, [$=1/T_c$] of the store for the selected address pattern. Block 32 checks to see if the frequency, f, is greater than the number N, the number of multiplex elements, divided by the access time $T_c$, i.e. is $f > N/T_c$? If the answer is false indicating that the frequency is sufficiently low to avoid conflicts then one can proceed immediately to the block 52 and instruct the hardware address generator 14 to run, according to the selected address pattern.

However if the answer is true then one proceeds to the block 34 which relates to the steps of calculating the number of permissible accesses during which the accesses to one memory block should not exceed its buffer depth. By way of example if one assumes a buffer depth of 4 elements and a memory comprising 16 blocks then the total number of accesses is 64, also one should not line-up more than four addresses to any one buffer at any one instance. This calculation is done considering the total access frequency.

In the block 36 a simulation of one complete frame addressing is carried out so that it simulates a whole complete frame, calculates the address and sees which buffer element it goes to. In response to each newly calculated address the number of addresses currently applied to an appropriate buffer element is incremented by one, this operation denoted by block 38. The block 40 denotes checking if the count for a particular element is too high. If the answer is true indicating that a fifth (or more address) to an element has been noted then this indicates a conflict and the conflict is recorded, block 42. In the case of there being no conflicts and/or after a conflict has been recorded, a check is made to see if all the addresses have been calculated, block 44.

If the answer is false then the processing sequence reverts to the block 36 and the calculation of the addresses continues, the steps denoted by the blocks 38 to 42 being repeated. If the answer is true then a check is made to see if there are any conflicts, block 46. If there are none then one can instruct the hardware address generator to run and apply the calculated addresses to the data to be stored. If there are conflicts then in block 48 a check is made if the number of conflicts is less than the size of the vestigial memory 18. As far as the operation of the frame store is concerned it is easier to use the vestigial memory option than the other options of adding offsets or skipping memory locations which involve additional calculations. Accordingly if the answer to the question posed by block 48 is true then the address generator 14 is instructed to remap the addresses in accordance with the calculated addresses, block 50.

If the number of conflicts exceeds the capacity of the vestigial memory 18 then it is necessary to check to see if the conflicts are grouped, block 54. If the answer is false then it means that the conflict cannot be resolved using the algorithm being tried and an error message is generated. Alternatively if the answer is true then it is necessary to check if the number in the group(s) is less than twice the number of memory elements in the buffer, block 56. In the case of true answer then an offset is added, block 58, such that the boundary is shifted so that the conflicts are shared between the memory elements associated with two memory blocks. If the answer is false then also an error message is generated. Thereafter remapping of the addresses takes place in accordance with the operation denoted by the block 50. The flow chart terminates with the previously described block 52.

In order not to complicate the flow chart unduly three simpler options have not been included. The first is that if conflicts are detected, block 48, then one can change the frequency of accessing until the conflicts are eliminated. The second option which is available, but not shown, is a general remapping of all addresses in the main memory 16 thereby avoiding the use of the vestigial memory. The third option is to provide additional buffering at the write-in ports, which buffering can be filled during the line scan and emptied during the flyback period or during the dead time in the scan. In operation the flow chart reaches the block 36 and at the end of the line in an address calculation a check is made to see if there is sufficient time to empty the buffer into the store. If there is sufficient time then the flow chart proceeds to the block 52. Alternatively if there is not then the process continues as described previously.

I claim:

1. A method of storing data in a memory of a data processing system, which memory comprises a plurality of memory blocks, characterized in that said method comprises the steps of:
   (a) checking if storing according to a standard address pattern is applicable for a required storage operation without infringing an access restricting of the addressed memory block, and in the case where said standard address pattern is applicable, activating an address generator for generating addresses according to said standard address pattern;
   (b) in the case where said standard address pattern is not applicable, remapping, according to a first predetermined distribution pattern, the addresses of those locations in the memory to which access is required;
   (c) checking if storing according to said first predetermined distribution pattern is applicable for the required storage operation without infringing an access restriction of the addressed memory block, and in the case where said first predetermined distribution pattern is applicable, activating said address generator for generating addresses according to said first predetermined distribution pattern; and
   (d) in the case where said first predetermined distribution pattern is not applicable, generating a first conflict signal.

2. A method as claimed in claim 1, characterized in that, after generating said first conflict signal, the method comprises the steps of:
   (a) remapping, according to a second predetermined address pattern, the addresses of those locations in the memory to which access is required;
   (b) checking if storing according to said second predetermined address pattern is applicable for the required storage operation without infringing an access restriction of the addressed memory block, and in the case where said second predetermined address pattern is applicable, activating said address generator for generating addresses according to said second predetermined address pattern; and
   (c) in the case where said second predetermined address pattern is not applicable, generating a second conflict signal.

3. A method as claimed in claim 1, characterized in that said remapping according to a first predetermined distribution pattern comprises decreasing the frequency of access to the memory.

4. A method as claimed in claim 2, characterized in that said remapping according to said second predetermined address pattern comprises the redistribution over an offset added to the store addresses.

5. A method as claimed in claim 2, characterized in that said remapping according to said second predetermined address pattern comprises the remapping of the address infringing the access restriction to a location of a vestigial memory and the storage in said vestigial memory of the associated data.

6. A method as claimed in any one of the claims 1 to 5, for application to a display device with line-wise scanning, characterized in that said remapping comprises the remapping of the address infringing the access restriction to a buffer, said buffer being filled during a line scan and emptied during the flyback period of said scanning.

7. A data processing system for applying the method according to claim 6, comprising a main memory, a vestigial memory, an address generator for generating storage addresses for data to be stored in the main or vestigial memory, characterized in that said data processing system comprises means for mapping the address of a storage location for data according to a given pattern, means for checking if there are addresses infringing an access restriction of said main memory, and means for resolving said infringements by remapping the infringing addresses, said means for resolving having an output for instruction the address generator to generate addresses in accordance with said remapping.

8. A data processing system as claimed in claim 7, characterized in that said main memory is provided with an additional write-in buffer.

* * * * *